United States Patent [19]

Nakagawa

[11] Patent Number: 5,043,974

[45] Date of Patent: Aug. 27, 1991

[54] DISC CARTRIDGE

[75] Inventor: Kenzo Nakagawa, Kanagawa, Japan

[73] Assignee: Sony Corporation, Tokyo, Japan

[21] Appl. No.: 406,788

[22] Filed: Sep. 12, 1989

[30] Foreign Application Priority Data

Sep. 26, 1988 [JP] Japan ............................ 63-240264

[51] Int. Cl.⁵ .................... G11B 33/00; G11B 33/02
[52] U.S. Cl. .................................. 369/291; 369/292;
206/444; 206/586
[58] Field of Search .................. 369/291, 277, 77.2,
369/13, 270, 271, 14, 266; 206/444, 307;
220/200, 378; 360/137, 133; 242/84.8

[56] References Cited

U.S. PATENT DOCUMENTS

| 3,030,728 | 4/1962 | Wesman | 206/586 |
|---|---|---|---|
| 3,041,775 | 7/1962 | Brown | 206/586 |
| 3,404,827 | 10/1968 | Carmody | 206/586 |
| 3,695,421 | 10/1972 | Wood | 206/586 |
| 3,701,465 | 10/1972 | Richter | 206/586 |
| 3,812,588 | 5/1974 | Bennett | 242/84.8 |
| 3,836,043 | 9/1974 | Levin | 206/586 |
| 4,127,192 | 11/1978 | Card | 206/586 |
| 4,496,054 | 1/1985 | Koltun | 206/586 |
| 4,535,434 | 8/1985 | Kishi | 369/291 |
| 4,542,495 | 9/1985 | Ziegler | 369/291 |
| 4,636,904 | 1/1987 | Matsumo | 360/133 |
| 4,740,948 | 4/1988 | Nakamori | 206/444 |
| 4,782,417 | 11/1988 | Tanaka | 360/133 |

FOREIGN PATENT DOCUMENTS

| 0104380 | 9/1986 | Japan | 369/292 |
|---|---|---|---|
| 0014786 | 1/1989 | Japan | 369/292 |

Primary Examiner—Stuart S. Levy
Assistant Examiner—John Pokotylo
Attorney, Agent, or Firm—Philip M. Shaw, Jr.

[57] ABSTRACT

A disc cartridge having a cartridge body in which a magneto-optical disc is rotatably accommodated in a hermetic-fashion so as to be capable of recording and-/or reproduction. The cartridge body has a concave recessed portion extended from an insertion side end face of the cartridge body to a central portion of the cartridge body to allow the introduction of an external magnetic field generating means which generates an external magnetic field to record an information signal on the magneto-optical disc accommodated within the cartridge body.

11 Claims, 3 Drawing Sheets

DISC CARTRIDGE

BACKGROUND OF THE INVENTION

1. Field of the Invention

The present invention relates generally to disc cartridges and more particularly to a disc cartridge in which a magneto-optical disc is rotatably accommodated in a hermetic-fashion for recording and/or reproduction.

2. Description of the Prior Art

An optical disc recording and/or reproducing apparatus has been known, in which an optical disc, formed of a disc substrate and an optical record medium formed thereon, is used as a high density information recording disc and information is recorded on and/or reproduced from the optical disc by the impingement of a laser light on this optical disc. The family of the optical disc might be a read-only type optical disc (for example, a compact disc, etc.) from which an information can be reproduced only, a write-once type optical disc in which information can be written, and a rewritable-type optical disc (for example, a magneto-optical disc) in which information can be rewritten.

According to these optical discs, the recording and/or reproduction is generally carried out under the condition that the optical disc is loaded onto a recording and/or reproducing apparatus. When the optical disc is treated in this way, there is then a possibility that the optical disc surface will be smudged by fingermarks or that the optical disc surface will be damaged by scratches and so on. This causes an error in the recording or reproduction. To solve the above-noted problem, it is proposed to use a disc cartridge which rotatably accommodates an optical disc. This disc cartridge is disclosed, for example, in Japanese Laid-open Utility Model Gazette No. 61-174078.

This type of disc cartridge is designed so that it can be used sufficiently under normal circumstances. However, this type of disc cartridge can not demonstrate its efficiency sufficiently under some special circumstance such as in the cabin of an aircraft where atmospheric pressure is changed considerably. To eliminate the above-noted defect of the prior-art disc cartridge, a hermetic-type disc cartridge is proposed, in which the optical disc is accommodated in an airtight fashion so that it can be used in the special circumstance (see Japanese Published Patent Gazette No. 60-48818 and U.S. Pat. No. 4,535,434, etc.).

The magneto-optical disc in which an information signal can be rewritten needs external auxiliary magnetic field to record an information signal. Accordingly, in any of the disc cartridge&in which the magneto-optical disc is accommodated and the hermetic-type disc cartridge, external magnetic field generating means is opposed to the magneto-optical disc from the outside of the housing and a magnetic field from the external magnetic field generating means is supplied to the record medium surface of the magneto-optical disc through the housing.

In the prior-art disc cartridge, however, the inside spacing of the housing causes the external magnetic field generating means provided outside of the housing and the magneto-optical disc provided inside of the housing to become distant from each other by a predetermined distance, whereby the magnetic field from the external magnetic field generating means can not be supplied with sufficient flux strength to the record medium surface of the magneto-optical disc. The magneto-optical recording can not be therefore carried out positively.

In particular, the hermetic-type disc cartridge is frequently used under some special circumstance such as the cabin of an aircraft in which atmospheric pressure is considerably changed. In that event, the prior-art disc cartridge has a space in its inside so that, when the disc cartridge is applied with internal or external pressure, the housing of the disc cartridge is caused to be warped, thereby deforming the disc cartridge considerably. As a result, upon use, the disc cartridge thus deformed can not be loaded onto a disc drive apparatus. Further, it is frequently observed that, when the disc cartridge is considerably deformed, trouble occurs when trying to rotate the disc accommodated within the disc cartridge.

OBJECTS AND SUMMARY OF THE INVENTION

Accordingly, it is an object of the present invention to provide an improved disc cartridge which can eliminate the above-noted defects encountered with the prior art.

It is another object of the present invention to provide a disc cartridge in which an external magnetic field generating means is located as near as possible to the magneto-optical disc contained by the housing, thereby effecting a magneto-optical recording positively.

It is still another object of the present invention to provide a disc cartridge of a structure which can not be affected by inside or outside pressure applied to a housing of the disc cartridge.

According to an aspect of the present invention, there is provided a disc cartridge comprising:

(a) a cartridge body in which a magneto-optical disc is rotatably accommodated; and (b) a recessed portion formed on said cartridge body in a range from an insertion side edge of said cartridge body to a central portion of said cartridge body, said recessed portion allowing the introduction of an external magnetic field generating means for generating an external magnetic field to record an information signal on said magneto-optical disc accommodated.

According to another aspect of the present invention, there is provided a disc cartridge comprising:

(1) a cartridge body in which a disc having a rotor mounted on its inner peripheral portion is rotated by a rotation magnetic field produced from the outside and in which said disc is accommodated in a hermetic-fashion;

(2) a rotor cover provided on said cartridge body at its portion opposing to said rotor; and (3) screw means for screwing a central portion of said rotor cover to the other surface of said cartridge body under the condition that said rotor cover is mounted on one surface of said cartridge body.

These and other objects, features and advantages of the present invention will be apparent in the following detailed description of a preferred embodiment when read in conjunction with the accompanying drawings, in which like reference numerals are used to identify the same or similar parts in the several views.

DETAILED DESCRIPTION OF A PREFERRED EMBODIMENT

Figure 1:
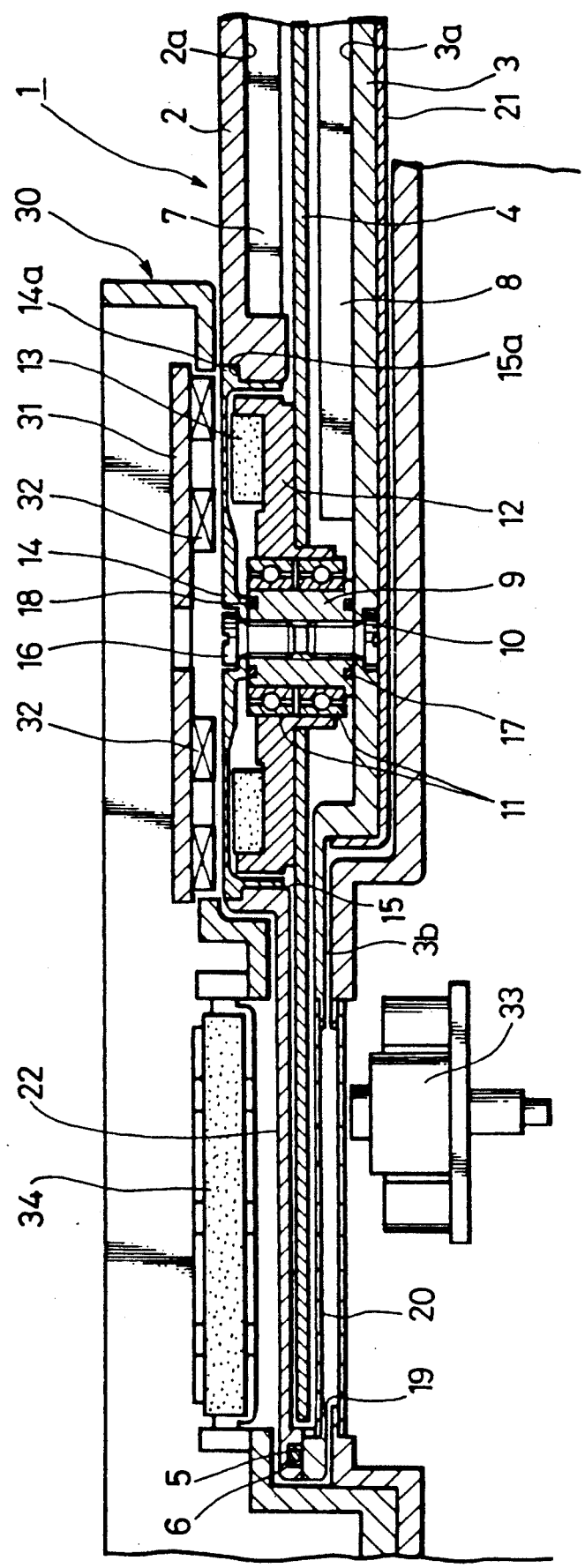
FIG. 1 is a longitudinal side view in cross-section illustrating a disc cartridge of the present invention which is loaded on a disc drive apparatus.

A disc cartridge according to an embodiment of the present invention will hereinafter be described in detail with reference to the drawings.

In FIGS. 1-4, reference numeral 1 generally designates a disc cartridge. This disc cartridge 1 is comprised of an upper housing 2 and a lower housing 3 which are fastened together by some suitable means such as screws (not shown) or the like, thereby forming a cartridge body. Each of the upper housing 2 and the lower housing 3 is made of a metal having a predetermined strength, for example, aluminum. A magneto-optical disc 4 (hereinafter referred to as a disc for simplicity) is rotatably accommodated within the thus formed cartridge body. More specifically, circular disc accommodating concave portions 2a and 3a are respectively formed on the inner surfaces of the upper housing 2 and the lower housing 3, and the disc 4 is accommodated between the disc accommodating concave portions 2a and 3a.

Figure 4:
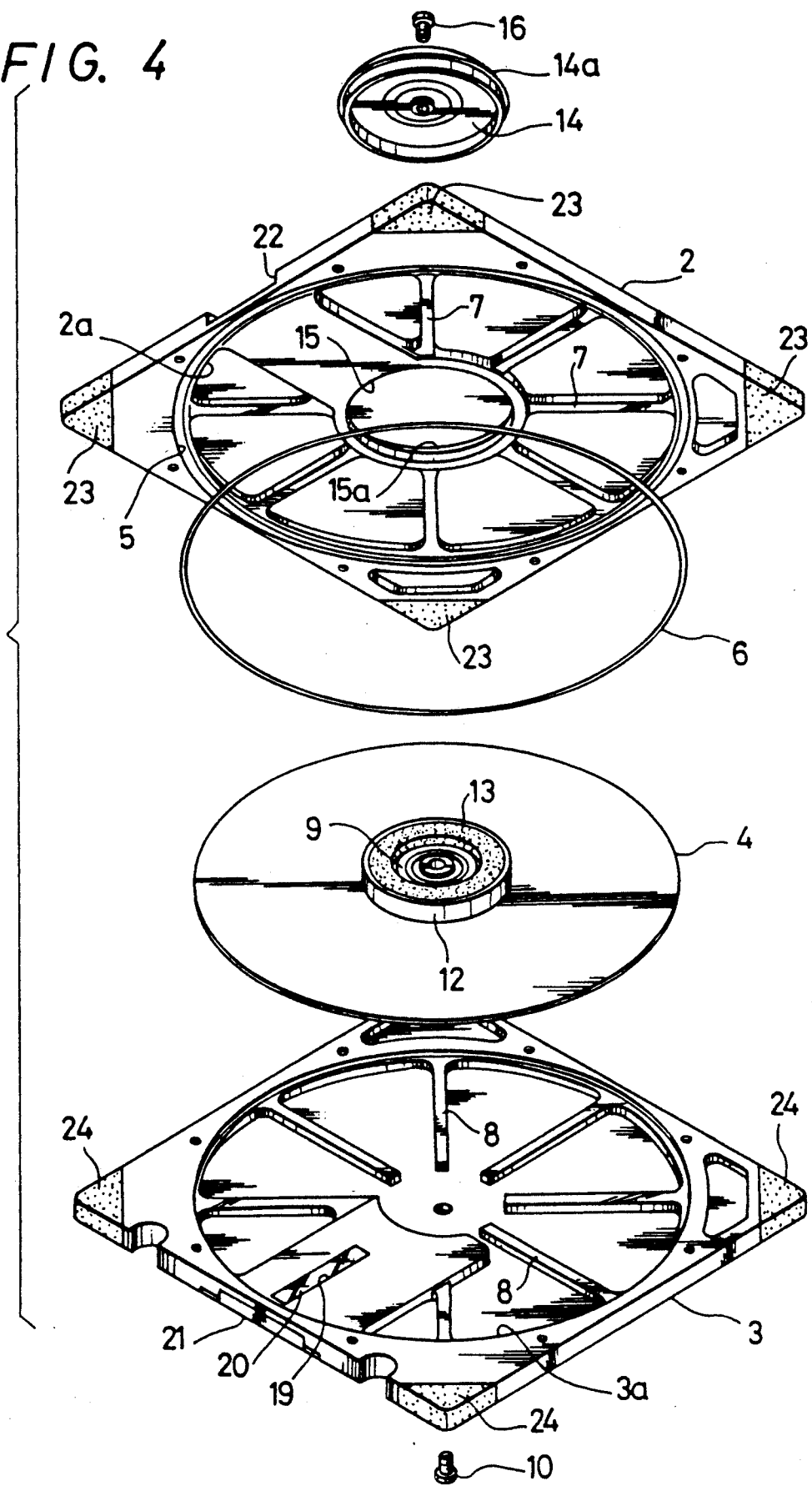
FIG. 4 is a perspective view illustrating the disc cartridge of FIG. 2 in the exploded state.

As shown in FIG. 4, in the upper housing 2, a circular groove 5 is formed around the outer periphery of the disc accommodating concave portion 2a, and an O-ring 6 is set into the groove 5 so that it is sandwiched between the upper housing 2 and the lower housing 3. This O-ring 6 enables the inside of the disc cartridge 1 to be kept in an airtight condition, whereby the disc 4 is completely isolated from the air.

A plurality of ribs 7 and 8 are respectively formed on the inner surfaces of the two housings 2 and 3, i.e. the disc accommodating concave portions 2a and 3a so as to be radially extended from their central portions to the outer peripheries thereof. The ribs 7 and 8 render a predetermined rigidity to the two housings 2 and 3.

The disc 4 is supported to become freely rotatable at its central portion. More specifically, as shown in FIG. 1, a fixed shaft 9 is secured by a screw 10 to the central portion of the disc accommodating concave portion 3a of the lower housing 3. A reel hub 12, made of iron, is rotatably supported to the fixed shaft 9 through ball bearings 11. The disc 4 is secured to the reel hub 12 at its central portion by a bonding agent.

As shown in FIG. 1, a rotor magnet 13 is secured to the upper surface portion of the reel hub 12 so that, when the disc cartridge 1 is loaded on the disc drive apparatus as will be explained later, this rotor magnet 13 is opposed to a stator coil provided on the disc drive apparatus side.

Figure 2:
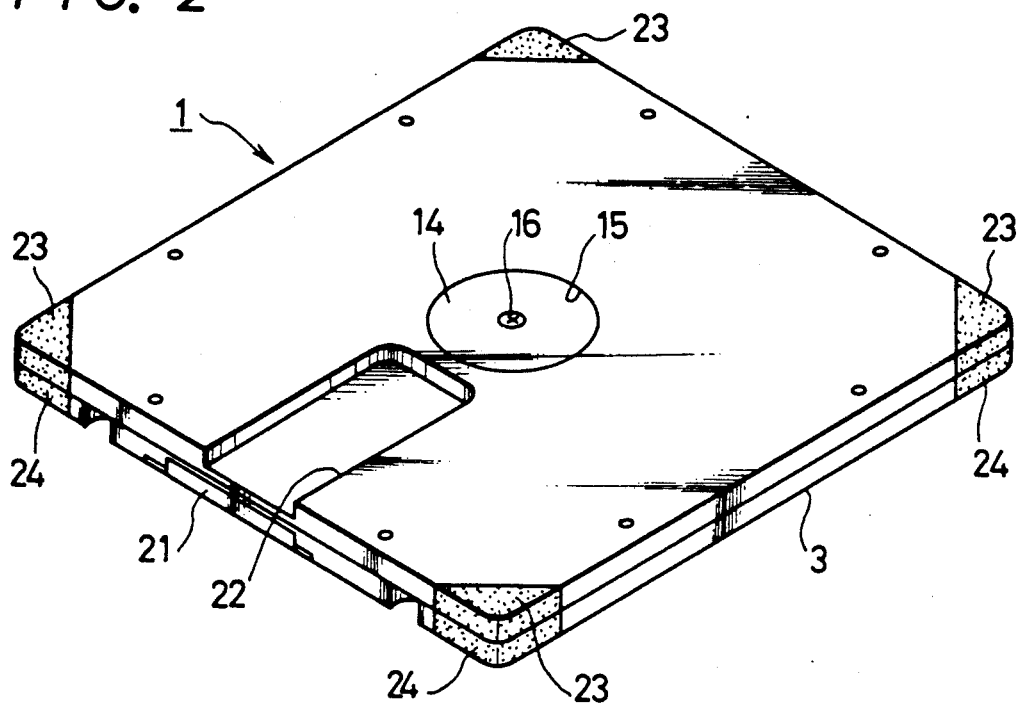
FIG. 2 is a perspective view of a disc cartridge according to an embodiment of the present invention.

The upper housing 2 is provided with a rotor cover 14 at its portion opposing the rotor magnet 13. To be more concrete, as shown in FIGS. 1 and 2, a fixing aperture 15 is formed through the central portion of the upper housing 2, and the rotor cover 14 is engaged into the fixing aperture 15 in such a manner that the upper surface of the rotor cover 14 becomes flush with the upper flat surface of the upper housing 2. Then, the rotor cover 14 is secured at its central portion to the fixed shaft 9 by a screw 16, and the outer peripheral surface of the rotor cover 14 and the inner peripheral surface of the fixing aperture 15 are bonded to each other by a bonding agent.

The rotor cover 14 is made of a material which provides a small eddy current loss relative to the rotary magnetic field produced from the stator coil of the disc drive apparatus side when the disc cartridge 1 is loaded onto the disc drive apparatus as will be discussed later, for example, a stainless steel. As the material which provides a small eddy current loss, it is possible to utilize a non-magnetic material of a predetermined strength such as a hard plastic and the like.

In the disc cartridge 1 according to this embodiment, the rotor cover 14 prevents the upper housing 2 from being warped. More specifically, as shown in FIG. 4, a flange portion 14a protrudes from the upper end edge of the outer peripheral surface portion of the rotor cover 14 over the whole periphery. In association with the flange portion 14a, a downwardly-stepped portion 15a is formed around the upper opening edge of the fixing aperture 15 of the upper housing 2. When the central portion of the rotor cover 14 is secured to the fixed shaft 9 of the lower housing 3 side by the screw 16 under the condition that the flange portion 14a of the rotor cover 14 is engaged with the stepped portion 15a in a surface-contact fashion, the rotor cover 14 pushes the central portion of the upper housing 2, preventing the upper housing 2 from being upwardly warped.

In the rotation supporting portion of the disc 4, as shown in FIG. 1, an O-ring 17 is engaged into a groove formed on the lower end face of the fixed shaft 9 such that it is sandwiched between the lower housing 3 and the fixed shaft 9. Further, an O-ring 18 is engaged into a groove formed on the upper end face of the fixed shaft 9 such that it is sandwiched between the rotor cover 14 and the fixed shaft 9. These O-rings 17 and 18 seal the inside of the disc cartridge 1 so as to prevent air from entering into the inside of the disc cartridge 1 from the apertures into which the screws 10 and 16 are inserted.

In the disc cartridge of this embodiment wherein the disc 4 is rotatably accommodated in the airtight-fashion as described above, as shown in FIG. 3, a window aperture portion 19 is formed through a concave-shaped portion 3b formed on the front portion of the lower housing 3 along the radial direction of the disc 4, and the whole surface of the window aperture portion 19 is covered with a glass or transparent window 20 attached to the inside surface side of the window aperture portion 19. Upon recording and/or reproducing, light beams are introduced and/or emitted through this transparent window 20.

Figure 3:
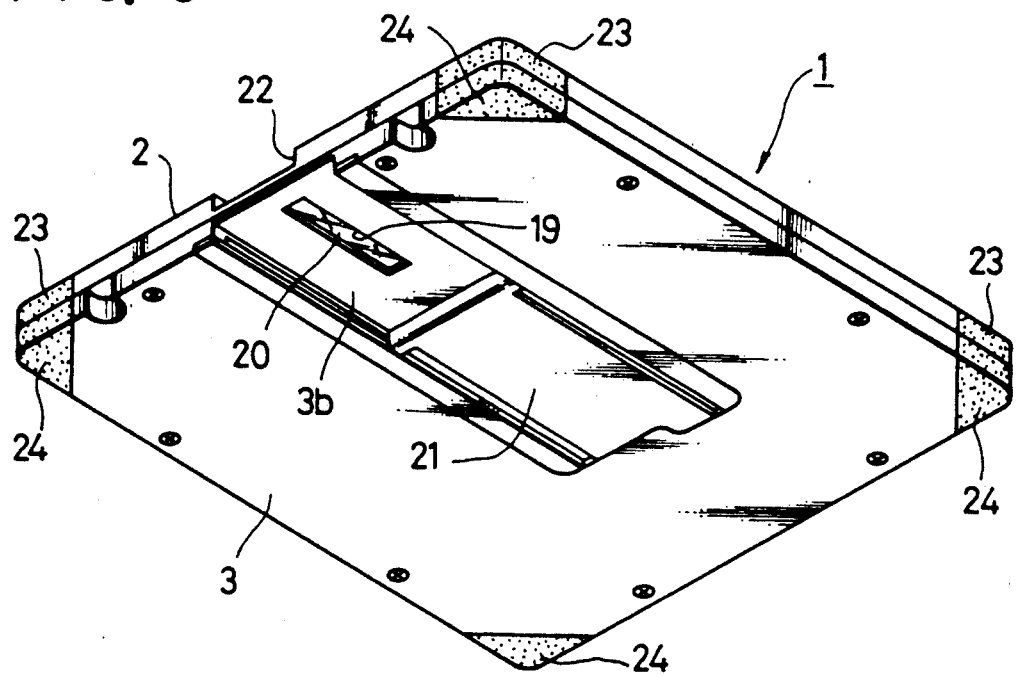
FIG. 3 is a perspective view of the disc cartridge of FIG. 2, and which illustrates the same from the bottom side.

As shown in FIG. 3, the lower housing 3 is provided with a slidable shutter 21 which opens and closes this window aperture portion 19. The slidable shutter 21 is adapted to be freely slidable in a back and forth direction, wherein upon non-use, or when the disc cartridge 1 is stored, the shutter 21 is located at the front sliding position to cover the window aperture portion 19, while upon use, or when the disc cartridge 1 is loaded onto the disc drive apparatus, the shutter 21 is slid backward to expose the window aperture portion 19.

As shown in FIGS. 1 and 2, in association with the window aperture portion 19, the upper housing 2 has a recessed portion 22 of a concave shape extended from its front edge to its central portion. This recessed portion 22 has a predetermined depth and the rear side surface of the bottom portion thereof is opposed to the disc 4 with a very small spacing, whereby when the disc cartridge 1 is loaded onto the disc drive apparatus, this recessed portion 22 allows the introduction of an external magnetic field generating means provided at the disc drive apparatus side for effecting the magneto-optical recording. In this embodiment, the bottom portion of the recessed portion 22 is formed very thin as compared with other portions. In other words, when the thickness of the flat portion of each of the housings 2 and 3 is, for example, about 2.5 mm, the thickness of the bottom portion of the recessed portion 22 is about 1 mm, thus enabling the magnetic field generated from the external magnetic field generating means to reach the disc 4 more positively.

As shown in FIGS. 2 and 3, resilient shock-absorbing members 23 and 24 are respectively secured to four corner portions of the upper and lower housings 2 and 3 of the disc cartridge 1 so that, when the disc cartridge 1 is shocked inadvertently, the shock can be absorbed by these resilient shock-absorbing members 23 and 24, thereby protecting the disc 4.

In FIG. 1, reference numeral 30 designates the disc drive apparatus onto which there is loaded the disc cartridge 1. Reference numeral 31 designates a stator yoke and 32 a stator coil secured to the under surface of the stator yoke 31. When the disc cartridge 1 is loaded onto the disc drive apparatus 30, the stator coil 32 is opposed to the rotor magnet 13 via the rotor cover 14, whereby the stator coil 32 and the rotor magnet 13 constitute a flat brushless motor. When the stator coil 32 is excited by passing an alternating electric current through it to produce a rotational magnetic field, the rotor magnet 13 is rotated, permitting the disc 4 to be rotated together with the rotor magnet 13.

In FIG. 1, reference numeral 33 designates an optical head, and when the disc cartridge 1 is loaded onto the disc drive apparatus 30, the optical head 33 is opposed to the window aperture portion 19. A light beam emitted from an objective lens (not shown) of this optical head 33 travels through a cover glass (not shown), provided to protect the optical head 33 from dust or the like, and the glass or transparent window 20 and forms a beam spot on the record medium surface of the disc 4, thus effecting the recording and/or reproduction.

Reference numeral 34 designates a magnet which is utilized as the external magnetic field generating means for recording a signal. When the disc cartridge 1 is loaded onto the disc drive apparatus 30, the magnet 34 is located within the recessed portion 22 of the upper housing 2. This magnet 34 supplies an external magnetic field to the record medium surface of the disc 4 to thereby effect the magneto-optical recording.

When the light beam emitted from the optical head 33 is focused on the record medium surface of the disc 4 under the condition that the record medium surface of the disc 4 is exposed to the external magnetic field, the external magnetic field inverts the magnetization in the record medium surface, thus making it possible to record a signal.

Since the disc cartridge 1 thus constructed according to this embodiment is of a so-called hermetic-type disc cartridge in which the disc 4 is rotatably accommodated between the upper and lower housings 2 and 3 in a hermetic-fashion, the disc cartridge 1 of the invention can be suitably utilized within the cabin of an aircraft. Further, the disc cartridge of the invention is expected to be used in some special circumstances such as space and the like.

Further, in the disc cartridge 1 of the present invention, the central portion of the upper housing 2 is pushed by the rotor cover 14 so that, even when the upper housing 2 intends to upwardly warp due to the change of pressure inside and/or outside of the disc cartridge 1, this warping of the upper housing 2 can be suppressed as much as possible by the rotor cover 14, thus preventing the disc cartridge 1 from being warped considerably.

In the rotation of the disc 4, the rotor cover 14 is made of the stainless steel so that there is only a of small eddy current loss so a sufficiently strong rotational magnetic field, generated by the stator coil 32, is supplied to the rotor magnet 13, causing the disc 4 to be stably rotated.

Furthermore, this disc cartridge 1 is provided with the recessed portion 22 in which there is located the magnet 34 as the external magnetic field generating means and also this recessed portion 22 is formed thin. This reduces the distance between the magnet 34 and the disc 4, which gives a sufficient magnetic field, generated from the magnet 34, to the record medium surface of the disc 4, thus making it possible to effect the magneto-optical recording positively.

According to the present invention, as set out above, since the disc cartridge housing of the present invention is provided with the recessed portion in which there is located an external magnetic field generating means for effecting the magneto-optical recording, the external magnetic field generating means is able to be located in close proximity of the disc. The magnetic field from the external magnetic field generating means thus sufficiently supplied to the record medium surface of the disc, making it possible to effect a positive magneto-optical recording.

Having described a preferred embodiment of the present invention in detail with reference to the accompanying drawings, it is to be understood that the present invention is not limited to that precise embodiment and that many changes and modifications could be effected by one skilled in the art without departing from the spirit and scope of the invention as defined in the appended claims.

I claim as my invention:

1. A disc cartridge comprising:
  (a) a hermetically sealed cartridge housing in which a magneto-optical disc having a recording surface is rotatably accommodated; and
  (b) a recessed portion formed in the cartridge housing in a range from an insertion side edge of the cartridge housing to a central portion of the cartridge housing, the recessed portion allowing the introduction of an external magnetic field generating means for generating an external magnetic field to record an information signal on the recording surface of the magneto-optical disc.

2. The disc cartridge according to claim 1, in which the recessed portion includes a bottom panel which is juxtaposed to the recording surface of the disc and which is thin as compared with other portions of the cartridge housing which are juxtaposed to the recording surface of the disc.

3. The disc cartridge according to claim 1, in which the cartridge housing is formed such that the spacing between the inner surface of the cartridge housing corresponding to the bottom panel of the recessed portion and the magneto-optical disc is small as compared with the spacing between other portions of the inner surface of the cartridge housing and the recording surface of the magneto-optical disc.

4. A disc cartridge comprising:
   (a) a cartridge housing in which a disc having recording surface and a rotor mounted on its inner peripheral portion is rotated by the application of a rotational magnetic field produced from the outside and in which the disc is accommodated in a hermetic-fashion;
   (b) a rotor cover provided on one surface of the cartridge housing at its portion opposing the rotor; and
   (3) screw means for screwing a central portion of the rotor cover to the other surface of the cartridge housing.

5. The disc cartridge according to claim 4, in which the cartridge housing has a recessed portion extending from an insertion side edge of the cartridge housing to a central portion of the cartridge housing, thereby allowing the introduction of an external magnetic field generating means to generate a magnetic field for recording an information signal on the disc.

6. The disc cartridge according to claim 5, in which the recessed portion has a bottom surface which is juxtaposed to the disc and is thin as compared with other portions of the cartridge housing.

7. The disc cartridge according to claim 5, in which the cartridge housing is formed such that the spacing between the inner surface of the cartridge housing corresponding to the bottom surface of the recessed portion and the magneto-optical disc is small as compared with the spacing between other portions of the inner surface of the cartridge housing and the recording surface of the magneto-optical disc.

8. The disc cartridge according to claim 4, in which the rotor cover is made of a material which has a small eddy current loss.

9. The disc cartridge according to claim 8, in which the cartridge housing is made of metal.

10. The disc cartridge according to claim 9, in which the cartridge housing has formed therein a concave portion which becomes flush with the rotor cover when the rotor cover is attached thereto.

11. The disc cartridge according to claim 4, in which the screwing means includes a fixed shaft provided within the cartridge housing to rotatably support the rotor and a screw for mounting the rotor cover to the fixed shaft.

* * * * *